United States Patent
Xiao et al.

(10) Patent No.: US 11,671,714 B1
(45) Date of Patent: Jun. 6, 2023

(54) MOTION BASED EXPOSURE CONTROL

(71) Applicant: QUALCOMM Incorporated, San Diego, CA (US)

(72) Inventors: Zuguang Xiao, San Diego, CA (US); Ho Sang Lee, San Diego, CA (US); Wenbin Wang, San Diego, CA (US); Nan Cui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/583,033

(22) Filed: Jan. 24, 2022

(51) Int. Cl.
*H04N 23/73* (2023.01)
*H04N 23/743* (2023.01)
*H04N 23/68* (2023.01)

(52) U.S. Cl.
CPC ......... *H04N 23/73* (2023.01); *H04N 23/6811* (2023.01); *H04N 23/6845* (2023.01); *H04N 23/743* (2023.01)

(58) Field of Classification Search
CPC ............. H04N 5/2353; H04N 5/23254; H04N 5/23277; H04N 5/2356
See application file for complete search history.

(56) References Cited

U.S. PATENT DOCUMENTS

| | | | |
|---|---|---|---|
| 5,255,044 A | 10/1993 | Ishiguro | |
| 7,149,262 B1 * | 12/2006 | Nayar | G06T 3/4015 375/341 |
| 7,548,689 B2 * | 6/2009 | Yap | G03B 7/08 348/208.13 |
| 9,282,256 B1 * | 3/2016 | Shan | H04N 5/23254 |
| 9,338,349 B2 | 5/2016 | Sharma et al. | |
| 9,894,304 B1 * | 2/2018 | Smith | H04N 5/35581 |
| 2004/0036797 A1 * | 2/2004 | Stark | H04N 5/35509 348/229.1 |
| 2008/0179490 A1 | 7/2008 | Ohno et al. | |
| 2009/0231449 A1 * | 9/2009 | Tzur | H04N 5/235 348/208.6 |

(Continued)

FOREIGN PATENT DOCUMENTS

WO 2018057103 A1 3/2018

OTHER PUBLICATIONS

International Search Report and Written Opinion—PCT/US2022/080511—ISA/EPO—dated Feb. 13, 2023.

*Primary Examiner* — Jason A Flohre
(74) *Attorney, Agent, or Firm* — Polsinelli/Qualcomm

(57) ABSTRACT

Systems and techniques are described herein for capturing images. For instance, a process can include obtaining a first image associated with a first exposure setting and obtaining a second image associated with a second exposure setting that is different from the first exposure setting. The process can include obtaining motion information associated with at least one of the first image and the second image and determining, based on the motion information, that motion associated with a first pixel of the first image exceeds a threshold. The process can include generating, based on the motion information, a fused image including a first set of pixels from the first image and a second set of pixels from the second image. The first set of pixels from the first image includes the first pixel based on the determination that the motion associated with the first pixel exceeds the threshold.

30 Claims, 13 Drawing Sheets

(56) References Cited

U.S. PATENT DOCUMENTS

| | | | |
|---|---|---|---|
| 2010/0183245 A1* | 7/2010 | Oryoji | H04N 7/014 |
| | | | 382/299 |
| 2010/0259626 A1 | 10/2010 | Savidge | |
| 2012/0002899 A1* | 1/2012 | Orr, IV | H04N 9/07 |
| | | | 382/282 |
| 2013/0076937 A1* | 3/2013 | Tajima | H04N 5/2355 |
| | | | 348/E9.051 |
| 2015/0103221 A1* | 4/2015 | Kimura | H04N 5/3535 |
| | | | 348/308 |
| 2015/0350509 A1* | 12/2015 | Tico | G06T 5/50 |
| | | | 348/362 |
| 2016/0352995 A1* | 12/2016 | Min | G06T 5/50 |
| 2017/0237905 A1* | 8/2017 | Molgaard | H04N 5/23229 |
| | | | 348/208.6 |
| 2017/0359498 A1 | 12/2017 | Benchemsi et al. | |
| 2018/0205863 A1* | 7/2018 | Soga | H04N 5/2353 |
| 2020/0014871 A1* | 1/2020 | Matsumoto | H04N 5/35554 |
| 2020/0175660 A1* | 6/2020 | Iijima | G06T 5/009 |
| 2021/0365707 A1 | 11/2021 | Mao et al. | |
| 2022/0020128 A1* | 1/2022 | Roy | G06T 7/55 |

* cited by examiner

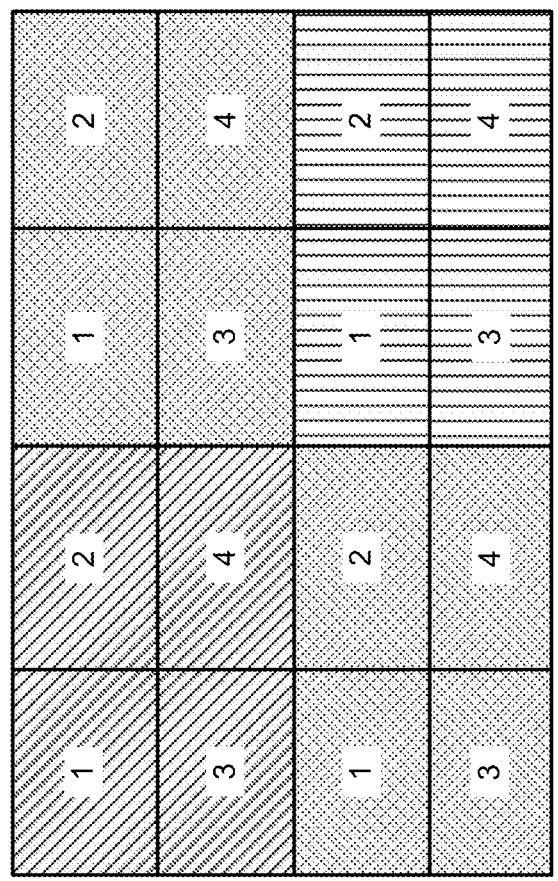

MOTION BASED EXPOSURE CONTROL

FIELD

The present disclosure generally relates to exposure control for image capture devices. In some examples, aspects of the present disclosure are related to adjusting exposure settings for capturing images of objects in motion.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

Cameras can be configured with a variety of image capture and image processing settings. Application of different settings can result in frames or images with different appearances. Some camera settings are determined and applied before or during capture of the photograph, such as ISO, exposure time (also referred to as exposure duration), aperture size, f/stop, shutter speed, focus, and gain. Other camera settings can configure post-processing of a photograph, such as alterations to contrast, brightness, saturation, sharpness, levels, curves, or colors.

In photography, exposure of an image captured by a camera refers to the amount of light per unit area which reaches a photographic film, or in modern cameras, an electronic image sensor. The exposure is based on camera settings, such as shutter speed, exposure time, and/or lens aperture, as well as the luminance of the scene being photographed. Many cameras are equipped with an automatic exposure or "auto exposure" mode, where the exposure settings (e.g., shutter speed, exposure time, lens aperture, etc.) may be automatically adjusted to match, as closely as possible, the luminance of the scene or subject being photographed. In some cases, an automatic exposure control (AEC) engine can perform AEC to determine exposure settings for an image sensor.

BRIEF SUMMARY

In some examples, systems and techniques are described adjusting exposure settings for capturing images of objects in motion. According to at least one illustrative example, a method is provided for capturing images. The method includes: obtaining a first image associated with a first exposure setting; obtaining a second image associated with a second exposure setting, the second exposure setting being different from the first exposure setting; obtaining motion information associated with at least one of the first image and the second image; determining, based on the motion information, that motion associated with a first pixel of the first image exceeds a threshold; and generating, based on the motion information, a fused image including a first set of pixels from the first image and a second set of pixels from the second image, wherein the first set of pixels from the first image includes the first pixel based on the determination that the motion associated with the first pixel exceeds the threshold.

In another example, an apparatus for capturing images is provided that includes at least one memory (e.g., configured to store data, such as virtual content data, one or more images, etc.) and at least one processor (e.g., implemented in circuitry) coupled to the at least one memory. The at least one processor is configured to and can: obtain a first image associated with a first exposure setting; obtain a second image associated with a second exposure setting, the second exposure setting being different from the first exposure setting; obtain motion information associated with at least one of the first image and the second image; determine, based on the motion information, that motion associated with a first pixel of the first image exceeds a threshold; and generate, based on the motion information, a fused image including a first set of pixels from the first image and a second set of pixels from the second image, wherein the first set of pixels from the first image includes the first pixel based on the determination that the motion associated with the first pixel exceeds the threshold.

In another example, a non-transitory computer-readable medium is provided that has stored thereon instructions that, when executed by one or more processors, cause the one or more processors to: obtain a first image associated with a first exposure setting; obtain a second image associated with a second exposure setting, the second exposure setting being different from the first exposure setting; obtain motion information associated with at least one of the first image and the second image; determine, based on the motion information, that motion associated with a first pixel of the first image exceeds a threshold; and generate, based on the motion information, a fused image including a first set of pixels from the first image and a second set of pixels from the second image, wherein the first set of pixels from the first image includes the first pixel based on the determination that the motion associated with the first pixel exceeds the threshold.

In another example, an apparatus for capturing images is provided. The apparatus includes: means for obtaining a first image associated with a first exposure setting; means for obtaining a second image associated with a second exposure setting, the second exposure setting being different from the first exposure setting; means for obtaining motion information associated with at least one of the first image and the second image; means for determining, based on the motion information, that motion associated with a first pixel of the first image exceeds a threshold; and means for generating, based on the motion information, a fused image including a first set of pixels from the first image and a second set of pixels from the second image, wherein the first set of pixels from the first image includes the first pixel based on the determination that the motion associated with the first pixel exceeds the threshold.

In some aspects, the method, apparatuses, and computer-readable medium may include obtaining a third image associated with a third exposure setting that is different from the first exposure setting and the second exposure setting, wherein the fused image further includes a third set of pixels from the third image.

In some aspects, the first image, the second image, and the third image are obtained from a same image sensor.

In some aspects, the first exposure setting comprises a first exposure time and the second exposure setting comprises a second exposure time longer than the first exposure time.

In some aspects, wherein the first exposure setting and the second exposure setting each comprise a gain and an exposure time, and wherein a product of the exposure time and the gain of the first exposure setting is configured to be equal to a product of the exposure time and the gain of the second exposure setting.

In some aspects, wherein, to determine the motion associated with the first pixel of the first image exceeds the threshold, the method, apparatuses, and computer-readable medium may include generating a motion mask associated with the first pixel. In some cases, the motion mask is associated with an object and the first pixel is associated with the object. In some aspects, a location of the motion mask is based on projected motion of the object. In some examples, the projected motion of the object is based on a previous image captured prior to the first image and the second image.

In some aspects, the method, apparatuses, and computer-readable medium may include adjusting an exposure setting associated with the first set of pixels based on the motion information.

In some aspects, to adjust the exposure setting associated with the first set of pixels, the method, apparatuses, and computer-readable medium may include determining an amount of adjustment based on one or more of an amount of blur, a velocity of a feature associated with the first set of pixels, a velocity of an object associated with the first set of pixels, a size of a feature associated with the first set of pixels, and a size of an object associated with the first set of pixels.

In some aspects, the method, apparatuses, and computer-readable medium may include determining that adjusting the exposure setting based on the amount of adjustment will result in the exposure setting falling below a minimum exposure setting and, based on the determination, adjusting the exposure setting to the minimum exposure setting.

In some aspects, the method, apparatuses, and computer-readable medium may include determining, based on the motion information, that motion associated with a second pixel of the second image does not exceed the threshold, wherein the second set of pixels from the second image includes the second pixel based on the determination that the second pixel does not exceed the threshold.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 1A, FIG. 1B, and FIG. 1C are diagrams illustrating example configurations for an image sensor of an image capture device, in accordance with some examples;

DETAILED DESCRIPTION

Figure 1A:
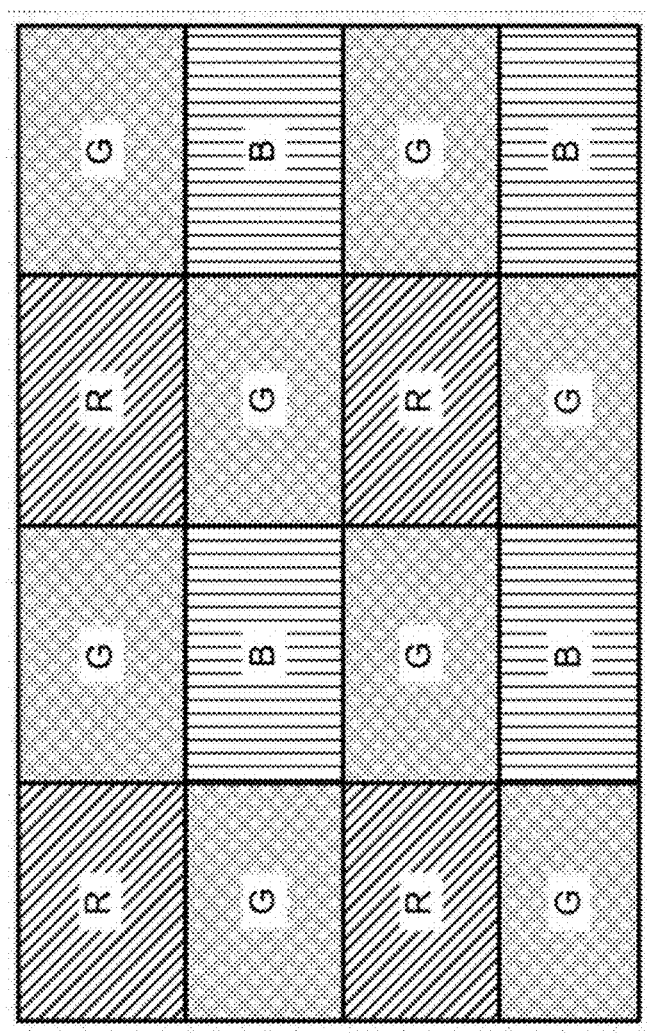

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Systems, apparatuses, processes (also referred to as methods), and computer-readable media (collectively referred to herein as "systems and techniques") are described herein for reducing blur of objects that are in motion in a scene captured by an image sensor of an image capture device. The systems and techniques can reduce blur of the objects that are in motion while maintaining the ability to capture images with a high dynamic range (HDR). In some aspects, the systems and techniques allow an image sensor to concurrently capture multiple images of a scene corresponding to different exposure settings (e.g., shutter speed, lens aperture, exposure length and/or gain) and generate combined images using pixel data from the different images based on local characteristics associated with objects of the captured scene. For example, pixels from an image corresponding to a short exposure time (e.g., 5 millisecond (ms)) can be used for portions of the scene that contain objects in motion. In some cases, pixels from an image corresponding to a short exposure time and a high gain can be used in regions where there is motion and low illumination. In some aspects, pixels from an image corresponding to a short exposure time and a high gain can be used in regions where there is motion and low illumination.

The image capture device may include mechanisms for calculating the appropriate exposure settings for images captured by the image sensor of the image capture device. In some examples, the exposure settings of the image capture device may be dynamically adjusted. For example, the exposure settings can include settings for an aperture of a lens of the image capture device. In some examples, exposure settings can also include settings for sensitivity or gain of the image sensor, which may be based on standards, such as an international standards organization (ISO) defined sensitivity (also known as an ISO sensitivity). The exposure settings for the aperture and shutter speed can control the amount of time an image of a scene is exposed to the image sensors of the image capture device, for example. In addition or alternatively, exposure time can be controlled electronically without requiring a physical shutter to close and block light from the image sensors of the image capture device.

Image sensors include one or more arrays of photodiodes or other photosensitive elements. Each photodiode measures an amount of light that eventually corresponds to a particular pixel in the image produced by the image sensor. In some cases, different photodiodes may be covered by different color filters of a color filter array and may thus measure light matching the color of the color filter covering the photodiode.

Figure 1B:
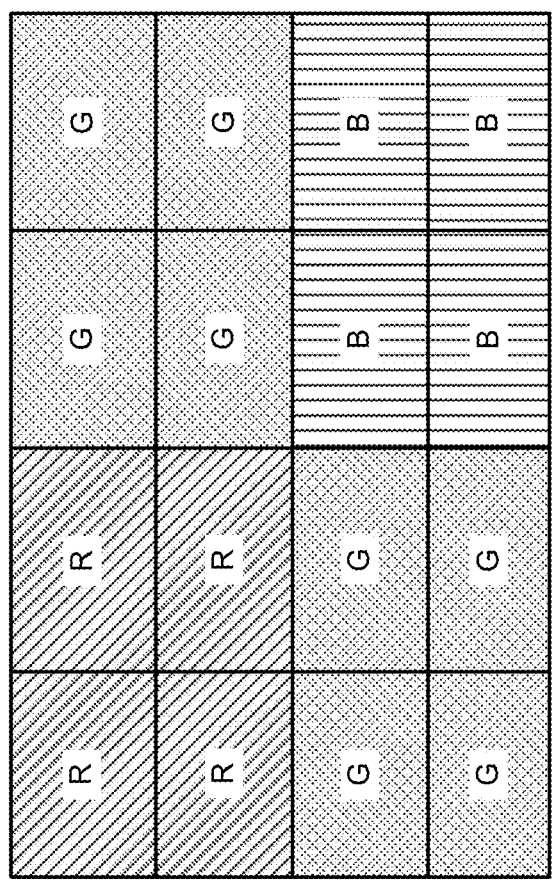

Various color filter arrays can be used, including a Bayer color filter array, a quad color filter array (also referred to as a quad Bayer filter or QCFA), and/or other color filter array. An example of a Bayer color filter array 100 is shown in FIG. 1A. As shown, the Bayer color filter array 100 includes a repeating pattern of red color filters, blue color filters, and green color filters. As shown in FIG. 1B, a QCFA 110 includes a 2×2 (or "quad") pattern of color filters, including a 2×2 pattern of red (R) color filters, a pair of 2×2 patterns of green (G) color filters, and a 2×2 pattern of blue (B) color filters. The pattern of the QCFA 110 shown in FIG. 1B is repeated for the entire array of photodiodes of a given image sensor. Using either QCFA 110 or the Bayer color filter array 100, each pixel of an image is generated based on red light data from at least one photodiode covered in a red color filter of the color filter array, blue light data from at least one photodiode covered in a blue color filter of the color filter array, and green light data from at least one photodiode covered in a green color filter of the color filter array. Other types of color filter arrays may use yellow, magenta, and/or cyan (also referred to as "emerald") color filters instead of or in addition to red, blue, and/or green color filters. The different photodiodes throughout the pixel array can have different spectral sensitivity curves, therefore responding to different wavelengths of light. Monochrome image sensors may also lack color filters and therefore lack color depth.

In some cases, subgroups of multiple adjacent photodiodes (e.g., 2×2 patches of photodiodes when QCFA 110 shown in FIG. 1B is used) can measure the same color of light for approximately the same region of a scene. For example, when photodiodes included in each of the subgroups of photodiodes are in close physical proximity, the light incident on each photodiode of a subgroup can originate from approximately the same location in a scene (e.g., a portion of a leaf on a tree, a small section of sky, etc.).

In some examples, a brightness range of light from a scene may significantly exceed the brightness levels that the image sensor can capture. For example, a digital single-lens reflex (DSLR) camera may be able to capture a 1:30,000 contrast ratio of light from a scene while the brightness levels of an HDR scene can exceed a 1:1,000,000 contrast ratio.

In some cases, HDR sensors may be utilized to enhance the contrast ratio of an image captured by an image capture device. In some examples, HDR sensors may be used to obtain multiple exposures within one image or frame, where such multiple exposures can include short (e.g., 5 ms), medium (e.g., 10 ms) and long (e.g., 15 or more ms) exposure times.

In some implementations, HDR sensors may be able to configure individual photodiodes within subgroups of photodiodes (e.g., the four individual R photodiodes, the four individual B photodiodes, and the four individual G photodiodes from each of the two 2×2 G patches in the QCFA 110 shown in FIG. 1B) to have different exposure settings. A collection of photodiodes with matching exposure settings is also referred to as photodiode exposure group herein. FIG. 1C illustrates a portion of an image sensor array with a QCFA filter that is configured with four different photodiode exposure groups 1 through 4. As shown in the example photodiode exposure group array 120 in FIG. 1C, each 2×2 patch can include a photodiode from each of the different photodiode exposure groups for a particular image sensor. Although four groupings are shown in a specific grouping in FIG. 1C, a person of ordinary skill will recognize that different numbers of photodiode exposure groups, different arrangements of photodiode exposure groups within subgroups, and any combination thereof can be used without departing from the scope of the present disclosure.

As noted with respect to FIG. 1C, in some HDR image sensor implementations, exposure settings corresponding to different photodiode exposure groups can include different exposure times (also referred to as exposure lengths), such as short exposure, medium exposure, and long exposure. In some cases, different images of a scene associated with different exposure settings can be formed from the light captured by the photodiodes of each photodiode exposure group. For example, a first image can be formed from the light captured by photodiodes of photodiode exposure group 1, a second image can be formed from the photodiodes of photodiode exposure group 2, a third image can be formed from the light captured by photodiodes of photodiode exposure group 3, and a fourth image can be formed from the light captured by photodiodes of photodiode exposure group 4. Based on the differences in the exposure settings corresponding to each group, the brightness of objects in the scene captured by the image sensor can differ in each image. For example, well-illuminated objects captured by a photodiode with a long exposure setting may appear saturated (e.g., completely white). In some cases, an image processor can select between pixels of the images corresponding to different exposure settings to form a combined image.

In one illustrative example, the first image corresponds to a short exposure time (also referred to as a short exposure image), the second image corresponds to a medium exposure time (also referred to as a medium exposure image), and the third and fourth images correspond to a long exposure time (also referred to as long exposure images). In such an example, pixels of the combined image corresponding to portions of a scene that have low illumination (e.g., portions of a scene that are in a shadow) can be selected from a long exposure image (e.g., the third image or the fourth image). Similarly, pixels of the combined image corresponding to portions of a scene that have high illumination (e.g., portions of a scene that are in direct sunlight) can be selected from a short exposure image (e.g., the first image.

In some cases, an image sensor can also utilize photodiode exposure groups to capture objects in motion without blur. The length of the exposure time of a photodiode group can correspond to the distance that an object in a scene moves during the exposure time. If light from an object in motion is captured by photodiodes corresponding to multiple image pixels during the exposure time, the object in motion can appear to blur across the multiple image pixels (also referred to as motion blur). In some implementations, motion blur can be reduced by configuring one or more photodiode groups with short exposure times. In some implementations, an image capture device (e.g., a camera) can determine local amounts of motion (e.g., motion gradients) within a scene by comparing the locations of objects between two consecutively captured images. For example, motion can be detected in preview images captured by the image capture device to provide a preview function to a user on a display. In some cases, a machine learning model can be trained to detect localized motion between consecutive images.

The systems and techniques described herein can utilize one or more of the photodiode exposure groups described above to select pixels from one or more images with short exposure times for portions of the scene where objects in motion are detected. In some cases, two or more photodiode exposure groups can be configured with short exposure times (e.g., 5 ms) but different gains. For example, pixels from an image corresponding to an exposure setting with a short exposure time a high gain can be used in regions where there is detected motion and low illumination. In some aspects, pixels from an image corresponding to an exposure setting with a short exposure time and a low gain can be used in regions where there is detected motion and high illumination. In some cases, for regions of the scene where there is low illumination and no motion, a third exposure setting with a long exposure time and a low gain can be used. In some cases, the product of a gain and an exposure time of an exposure setting can be referred to as the total exposure of the exposure setting. In one illustrative example, the total exposure of the second exposure setting can be configured to be equal to the total exposure the third exposure setting. In such an example, objects in low illumination portions of the combined image can have an equal or approximately equal total exposure whether or not the object is in motion.

Figure 2:
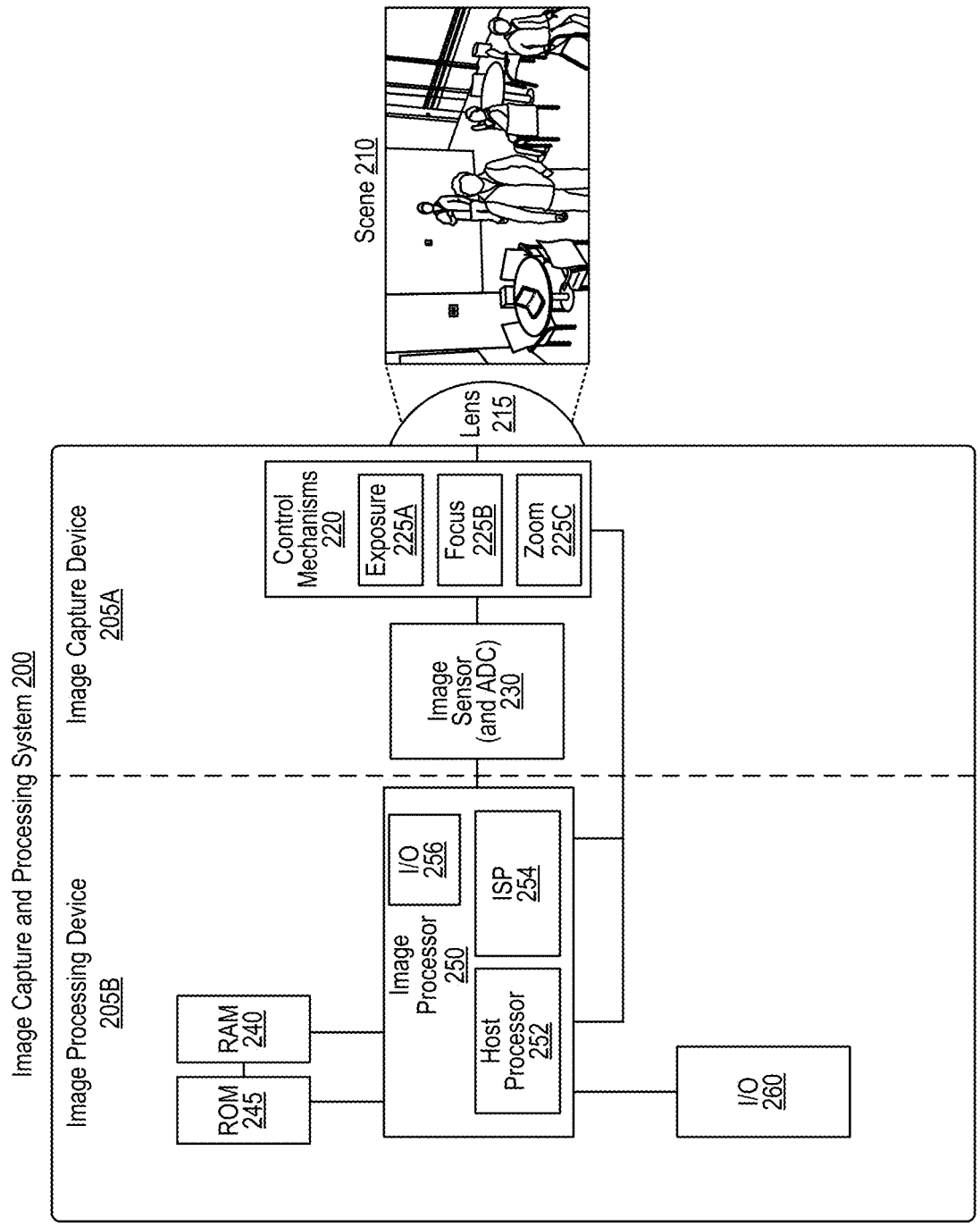
FIG. 2 is a block diagram illustrating an architecture of an image capture and processing device.

Various aspects of the techniques described herein will be discussed below with respect to the figures. FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. In some cases, the lens 215 and image sensor 230 can be associated with an optical axis. In one illustrative example, the photosensitive area of the image sensor 230 (e.g., the photodiodes) and the lens 215 can both be centered on the optical axis. A lens 215 of the image capture and processing system 200 faces a scene 210 and receives light from the scene 210. The lens 215 bends incoming light from the scene toward the image sensor 230. The light received by the lens 215 passes through an aperture. In some cases, the aperture (e.g., the aperture size) is controlled by one or more control mechanisms 220 and is received by an image sensor 230. In some cases, the aperture can have a fixed size.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo (or other lens mechanism), thereby adjusting focus. In some cases, additional lenses may be included in the image capture and processing system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 220, the image sensor 230, and/or the image processor 250. The focus setting may be referred to as an image capture setting and/or an image processing setting. In some cases, the lens 215 can be fixed relative to the image sensor and focus control mechanism 225B can be omitted without departing from the scope of the present disclosure.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 225C moves one or more of the lenses in the afocal zoom system, such as the negative lens and one or both of the positive lenses. In some cases, zoom control mechanism 225C can control the zoom by capturing an image from an image sensor of a plurality of image sensors (e.g., including image sensor 230) with a zoom corresponding to the zoom setting. For example, image processing system 200 can include a wide angle image sensor with a relatively low zoom and a telephoto image sensor with a greater zoom. In some cases, based on the selected zoom setting, the zoom control mechanism 225C can capture images from a corresponding sensor.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different filters. In some cases, different photodiodes can be covered in color filters, and may thus measure light matching the color of the filter covering the photodiode. Various color filter arrays can be used, including a Bayer color filter array (as shown in FIG. 1A), a QCFA (see FIG. 1B), and/or any other color filter array.

Returning to FIG. 1A and FIG. 1B, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 230) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 230 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 9:
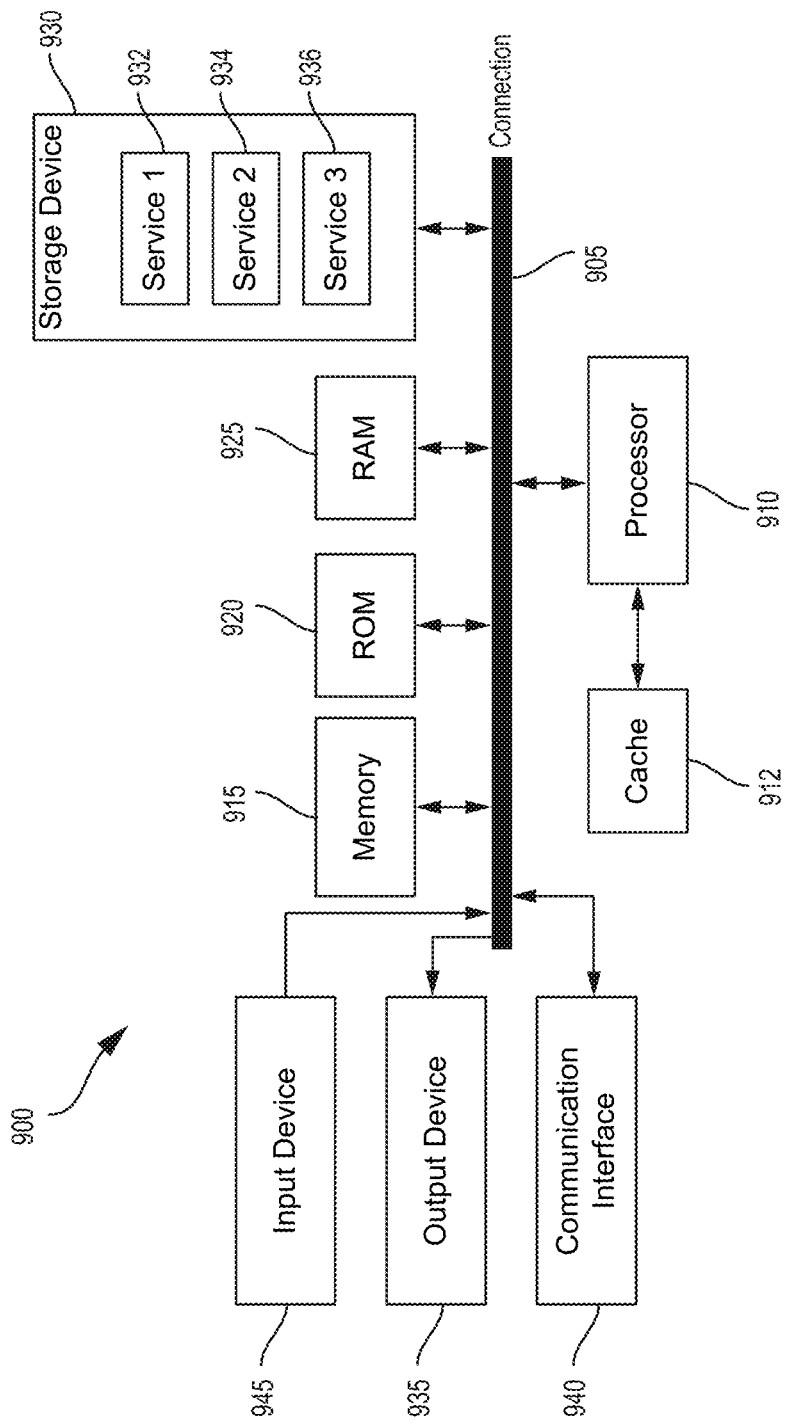
FIG. 9 is a diagram illustrating an example of a computing system for implementing certain aspects described herein.

The image processor 250 may include one or more processors, such as one or more image signal processors (ISPs) (including ISP 254), one or more host processors (including host processor 252), and/or one or more of any other type of processor 910 discussed with respect to the computing system 900 of FIG. 9. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 250 may store image frames and/or processed images in random access memory (RAM) 240/925, read-only memory (ROM) 245/920, a cache, a memory unit, another storage device, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 935, any other input devices 945, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the image capture and processing system 200 and one or more peripheral devices, over which the image capture and processing system 200 may receive data from the one or more peripheral device and/or transmit data to the one or more peripheral devices. The I/O 260 may include one or more wireless transceivers that enable a wireless connection between the image capture and processing system 200 and one or more peripheral devices, over which the image capture and processing system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

In some examples, the computing system 900 of FIG. 9 can include the image capture and processing system 200, the image capture device 205A, the image processing device 205B, or a combination thereof.

Figure 3:
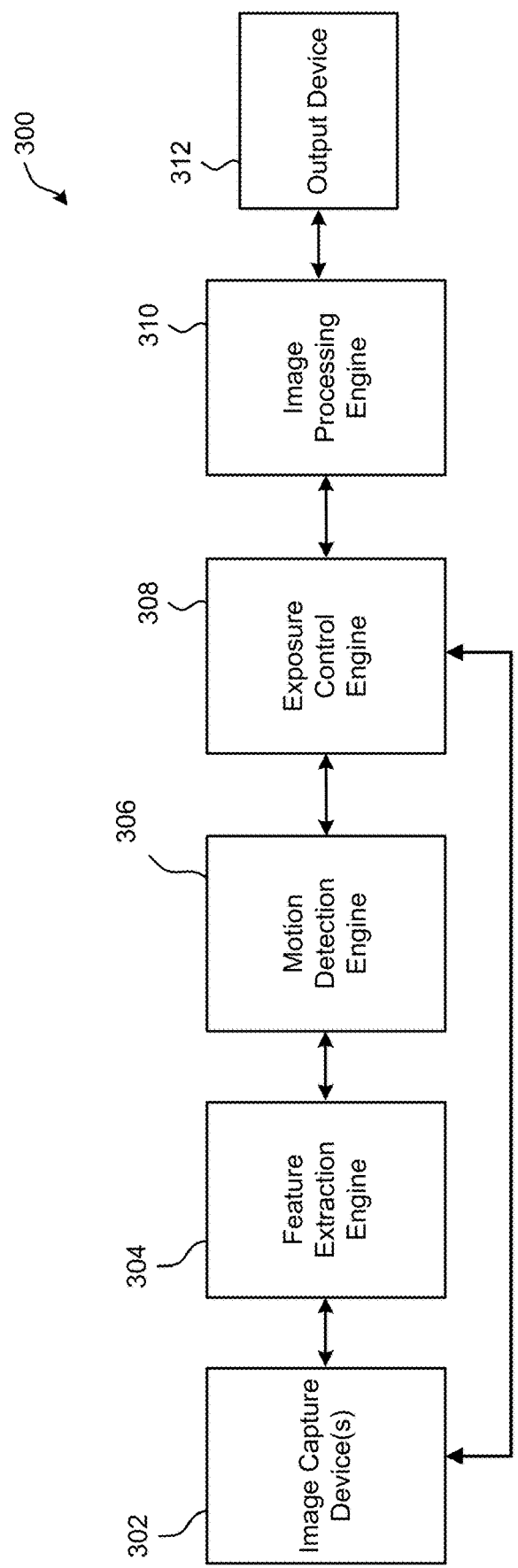
FIG. 3 is a block diagram illustrating an example of an exposure control system, in accordance with some examples.

FIG. 3 is a block diagram illustrating an example of an exposure control system 300. The exposure control system 300 includes various components that are used to process input images to produce clear representations of moving objects. The components of the exposure control system 300 can also be used for producing high dynamic range depictions of a scene in areas where there is no motion or an amount of motion below a predetermined threshold. As shown, the components of the exposure control system 300 include one or more image capture devices 302, feature extraction engine 304, motion detection engine 306, exposure control engine 308, image processing engine 310, and an output device 312.

The exposure control system 300 can include or be part of an electronic device or system. For example, the exposure control system 300 can include or be part of an electronic device or system, such as a mobile or stationary telephone handset (e.g., smartphone, cellular telephone, or the like), an extended reality (XR) device (e.g., a virtual reality (VR) device, an augmented reality (AR) device, or a mixed reality (MR) device), a vehicle or computing device/system of a vehicle, a server computer (e.g., in communication with another device or system, such as a mobile device, an XR system/device, a vehicle computing system/device, etc.), a desktop computer, a laptop or notebook computer, a tablet computer, a set-top box, a television, a camera device, a display device, a digital media player, a video streaming device, or any other suitable electronic device. In some examples, the exposure control system 300 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the exposure control system 300 (e.g., the one or more image capture devices 302, the feature extraction engine 304, the motion detection engine 306, the exposure control engine 308, the image processing engine 310, and the output device 312) can be part of the same computing device. In some implementations, the components of the exposure control system 300 can be part of two or more separate computing devices. In some cases, the exposure control system 300 can be implemented as part of the computing system 900 shown in FIG. 9.

While the exposure control system 300 is shown to include certain components, one of ordinary skill will appreciate that the exposure control system 300 can include more components or fewer components than those shown in FIG. 3. In some cases, additional components of the exposure control system 300 can include software, hardware, or one or more combinations of software and hardware. For example, in some cases, the exposure control system 300 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 3. In some implementations, additional components of the exposure control system 300 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the exposure control system 300.

In some implementations, the image capture device can operate in a binning mode by default. In some cases, the QCFA mode can be used when a scene with a high dynamic range is detected (e.g., based on statistics of the image pixel values).

The one or more image capture devices 302 can capture image data and generate images based on the image data and/or can provide the image data to the feature extraction engine 304, the motion detection engine 306, the exposure control engine 308, and/or the image processing engine 310 for further processing. The one or more image capture devices 302 can also provide the image data to the output device 312 for output (e.g., on a display). In some cases, the output device 312 can also include storage, such as one or more of cache 912, system memory 915, and storage device 930 of the computing system 900 of FIG. 9. An image can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image. In addition to image data, the image capture devices can also generate supplemental information such as the amount of time between successively captured images, timestamps of image capture, or the like.

Figure 4A:
FIG. 4A, FIG. 4B, and FIG. 4C are example images illustrating aspects of operation of an exposure control system, in accordance with some examples.

Referring to FIG. 4A, an example image 400 of a scene captured by an image capture device is shown. The example image 400 includes portions without motion and portions with motion. For example, vehicle 402 is in motion and because the exposure setting selected during capture of image 400, the vehicle 402 appears to be blurred. The remainder of the image 400 includes still objects. Some of the still objects have very low illumination, such as the low illumination portion 404 of the image 400 in the shadow of a tree. Some of the still objects have a high illumination such as the well illuminated portion 406 of the image 400 that includes the sun shining through a portion of trees in the scene. In the example of FIG. 4A, the well illuminated portion 406 can be so bright as to cause saturation of the photodiodes with relatively long exposure times.

Returning to FIG. 3, the feature extraction engine 304 can be trained to detect spatial information (e.g., features) associated with the one or more images. In some cases, the feature extraction engine 304 can be further trained to provide one or more classifications to objects in the one or more images based on the detected features. The feature extraction engine 304 can in turn use the classifications to segment the image into different portions associated with the one or more classifications. For example, the feature extraction engine 304 can segment the one or more images into different portions associated with people, buildings, cars, furniture, plants, or the like. In some cases, the features detected by feature extraction engine 304 can be output in the form of a feature vector.

The feature extraction engine 304 can also be trained to classify objects corresponding to the features extracted from the one or more images with one or more classifications. A training dataset that includes example images and classification labels can be used to train the feature extraction engine 304, such as using the techniques described with respect to FIG. 7 and FIG. 8 below. In one illustrative example, during inference (e.g., after the feature extraction engine 304 has been trained), the feature extraction engine 304 can use the feature vector to classify objects in the one or more input images. Example classifications can include "person," "face," "building," "tree," and any other classification for which the feature extraction engine 304 is trained to classify.

The motion detection engine 306 can detect motion of objects in the scene captured by the one or more image capture devices 302. In some cases, the motion detection engine 306 can determine an amount of motion in the scene based on two or more images obtained by the one or more image capture devices 302. In some cases, the two images can be consecutive images obtained by the one or more image capture devices 302. For the purposes of illustration, the illustrative example below includes discussion of motion detection based on two consecutive images captured by an image capture device. However, motion detection based on three or more images and/or non-consecutive images can also be used without departing from the scope of the present disclosure. In one illustrative, the motion detection engine 306 can obtain one or more features and associated pixel positions (e.g., the pixel position of the corner of a headlight of a vehicle) extracted by the feature extraction engine 304 from a first input image and a second input image. In some cases, the motion detection engine 306 can determine that some or all of the features obtained from the feature extraction engine 304 are common to both the first image and the second image.

In some aspects, the motion detection engine 306 can determine motion of the common features based on changes in the pixel positions of the common features between the first image and the second image. For example, if the pixel position associated with a feature is at a first location in the first image and at a second pixel location, different from the first pixel location, in the second image, then the motion detection engine 306 can determine that the feature has moved between frames. In some cases, the motion detection engine 306 can determine an amount and/or direction of movement of the feature. In some cases, the motion detection engine 306 can include an optical flow technique for motion estimation. In one illustrative example, the amount and direction of movement for each common feature can be represented as a vector in an optical flow map. In some examples, the motion detection engine 306 can also determine the velocity and/or acceleration of the feature. For example, using supplemental information from the one or more image capture devices 302, the motion detection engine 306 can calculate velocity based on the distance (e.g., in pixels) moved by the feature and the amount of time between the first image and the second image. In some cases, the motion detection engine 306 can project (or estimate) motion of the common features in subsequent frames. For example, the motion detection engine 306 can interpolate a likely position of the feature in a subsequent frame. In some cases, the first image and the second image used by the motion detection engine 306 to detect motion information from the scene can be images captured for providing a preview image on a display (e.g., output device 312) and/or images captured and stored in a buffer to support zero shutter lag image capture. Although an example optical flow technique for determining motion information is described above, the motion detection engine 306 can use any other suitable motion detection technique without departing from the scope of the present disclosure.

Figure 4B:
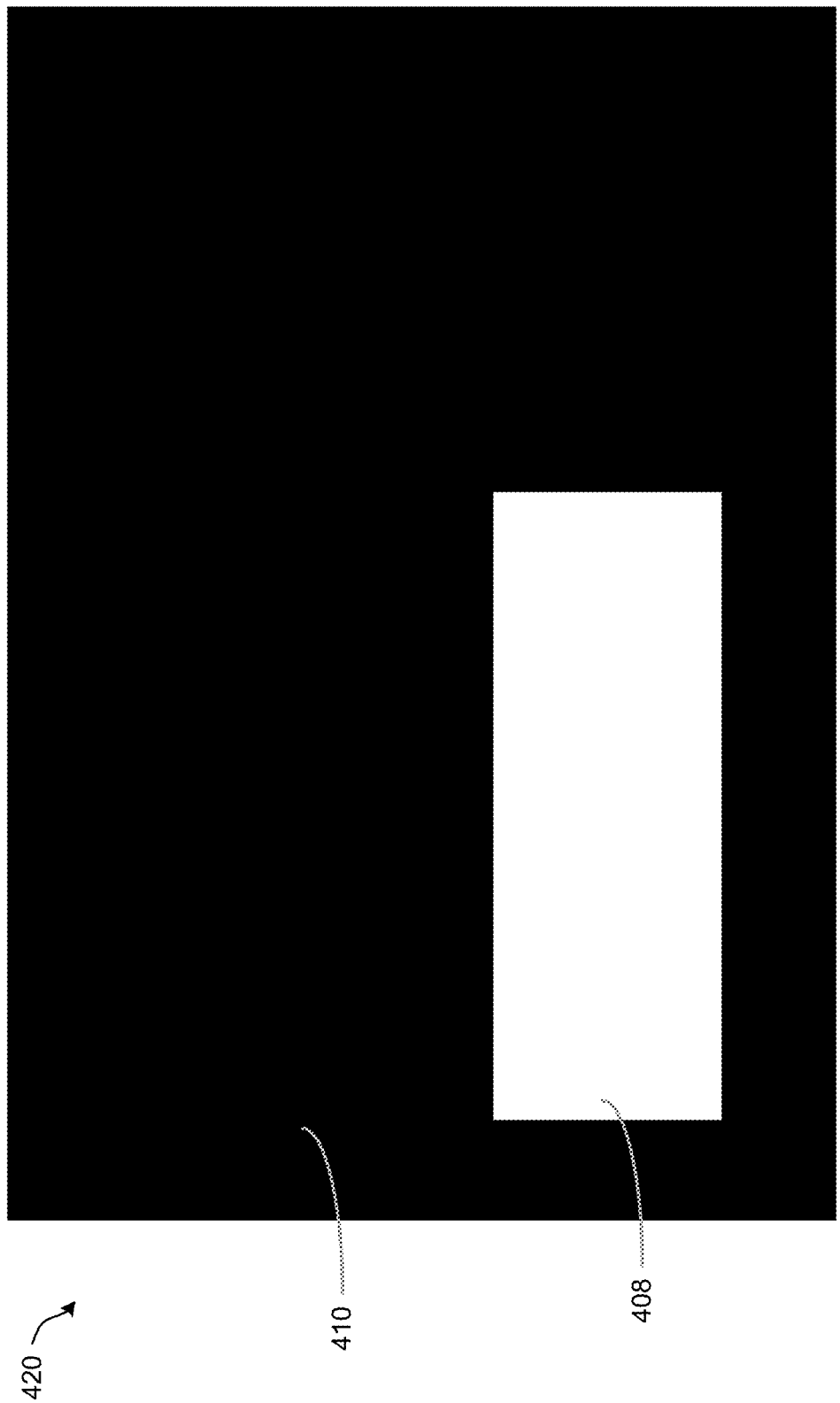

In some cases motion detection engine 306 can generate one or more motion masks corresponding to features in motion. The motion masks can correspond to pixels associated with the features that the motion detection engine 306 determines are in motion. FIG. 4B illustrates an example image 420 illustrating a motion mask 408 which can correspond to the pixel positions of detected motion corresponding to vehicle 402 of FIG. 4A. In the illustrated example of FIG. 4B, the motion mask 408 is shown as a rectangular shape bounding the vehicle 402 (also shown as a dashed outline of the motion mask 408 in FIG. 4C). The areas not included in any motion masks 410 are designed by a black color. In some cases, the motion detection engine 306 can output motion masks as well as information about the direction and/or amount of motion of features within the motion masks (collectively referred to as "motion information" herein). In some cases, the motion detection engine 306 can determine whether the amount and/or direction of motion of features (or objects) within the motion masks (e.g., motion mask 408) meets criteria for exposure adjustment by the exposure control engine 308. In some implementations, if the amount and/or direction of motion within a motion mask does not meet the criteria for adjustment, the motion detection engine can 306 can exclude such a motion mask (or features and/or objects associated with the motion mask) from the motion information passed to the exposure control engine. In another illustrative example, the motion detection engine 306 can pass all of the motion information to the exposure control engine 308 and the exposure control engine 308 can determine whether or not exposure adjustments are required.

In some implementations, the exposure control engine 308 can obtain motion information from the motion detection engine 306 and use the motion information to control exposure of pixel subgroups. The exposure control engine 308 can determine adjustments to exposure time to reduce the appearance of blur for objects in motion detected by the motion detection engine 306.

The exposure control engine 308 can be configured to control exposure settings of photodiode exposure groups of an image capture device, such as photodiode exposure groups 1 through 4 in a QCFA array shown and described with respect to FIG. 1C. In one illustrative example, photodiode exposure group 1 can be set with an exposure setting S1, photodiode exposure group 2 can be set with a first exposure setting S2, photodiode exposure group 3 can be set with a third exposure setting S3, and photodiode exposure group 4 can be set with a fourth exposure setting S4. For instance, the exposure settings S1, S2, S3, and S4 can include, without limitation, gain and exposure time. As used herein, a combination of the gain and exposure time set by the exposure control engine 308 can be referred to as "sensitivity." In some implementations, each of the exposure settings S1 through S4 can be independently controlled by the exposure control engine. In some cases, the exposure control engine 308 can set two or more of the exposure settings S1 through S4 equal to one another. An example of exposure settings that can be used for an HDR scene can include multiple exposure times such as short (e.g., 5 ms), medium (e.g., 10 ms) and long (e.g., 15 or more ms) exposure times. In one illustrative example, exposure setting S1 can be include the short exposure time, exposure settings S2 and S3 can include the medium exposure time, and exposure setting S4 can include the long exposure time. In some cases, all of the exposure settings can have a common gain value. In some cases, the exposure time can be used exclusively to control the sensitivity of each photodiode exposure group 1 through 4. In some implementations, the short, medium, and long exposure times can be set to static values that are used for every captured image that in an HDR mode. As described in more detail below, an image processing engine 310 can select pixels from different subgroups to generate a fused image. In some cases, the pixel selection can be based on the illumination level (e.g., entirely on the illumination level) of different portions of the scene.

In some examples, the exposure control engine 308 can include a motion detection exposure setting in addition or alternatively to exposure settings that include short, medium, and long exposure times. In some cases, the motion detection exposure setting can be used simultaneously with short, medium and long exposure settings. In some examples, the motion detection exposure setting can replace one of the short, medium, and long exposure settings. In one illustrative example, the exposure control engine 308 can configure an image capture device with short, medium, and long exposure settings when no motion is detected by the motion detection engine 306. In some cases, when motion is detected by the motion detection engine 306, the exposure control engine 308 can replace either the short, medium, or long exposure setting with the motion detection exposure setting.

In one illustrative example, a motion detection exposure setting can have an exposure time equal to the short setting and a gain that is larger than the gain set by the exposure control engine 308 for the short exposure setting. For example, the gain used for a motion detection exposure setting can be two times, five times, ten times as much as the gain used for the short exposure setting, or can have any other numerical correspondence to the gain used for the short exposure setting. In some implementations, a fixed exposure setting (e.g., sensitivity) can be used regardless of the amount of motion and/or the amount of illumination associated with one or more objects (or features) in motion.

However, in some cases, the exposure control engine 308 can dynamically adjust the exposure time and/or gain of the motion detection exposure setting based on the motion information. For example, if the amount of blur associated with a feature or object within a motion mask meets (or exceeds) certain motion criteria, the exposure control engine 308 can determine an adjustment to the motion detection. Examples of motion criteria can include an amount of blur, a determine velocity of an object and/or feature, a size of an object and/or feature, or any combination thereof. An example exposure control process is described in more detail below with respect to FIG. 5.

In some implementations, when an image of a scene does not include a high dynamic range, the exposure control engine 308 can set all of the photodiode exposure groups to a common exposure setting. In some examples, the image data collected by photodiodes of each pixel can be averaged (or binned) to generate the final image. In such an example, the image processing engine 310 may not need to perform the same calculations to select pixels from each of the photodiode subgroups.

Returning to FIG. 3, the image processing engine 310 can be configured to generate a fused image based on image data captured by different photodiode exposure groups of the image sensor for different portions of the captured scene. In one illustrative example, the image processing engine 310 can select pixels from a photodiode exposure group configured with the motion detection exposure setting for all pixels that correspond to the one or more motion masks. In some cases, for pixels outside the motion masks, the image processing engine 310 can select pixel data from photodiode exposure groups based on the illumination to provide HDR outside of the motion mask regions.

In some cases, the image processing engine 310 can also consider illumination levels within the pixels that are within a motion mask. For example, when an object in motion is well illuminated, the pixel data captured by photodiodes configured with the motion detection exposure setting can become saturated. In such cases, the image processing engine 310 can select pixels from a different exposure setting to avoid including saturated pixel data in the combined image. In some cases, pixel data from photodiodes configured with the short exposure setting (which may have a lower gain than the motion detection exposure setting), can selected by the image processing engine 310 even when the pixels are within a motion mask. In some cases, because the short exposure setting also has a low exposure time, the objects (or features) within the motion mask may also be captured with a low blur.

Figure 4C:

After determining which pixel data to select from the various photodiode exposure groups based on one or more of the selection techniques described above, the image processing engine 310 can combine the selected pixel data to generate a combined image that provides low blur in motion and HDR. Referring to FIG. 4C, the example image 440 illustrates a simulated image of the scene shown in image 400 of FIG. 4A with pixels associated with the motion mask 408 selected from photodiodes associated with a motion detection exposure setting. As a result, the vehicle 402 appears in the image without blur or with significantly reduced blur when compared to the image 400 of FIG. 4C.

As noted above, the exposure control system 300 and related techniques described herein can allow a system to detect objects (or features) in motion in captured images and adjust exposure time and/or select pixel data from photodiodes with a short exposure time in portions of the image that include objects (or features) in motion. For instance, using the exposure control system 300, an image capture device can capture images of vehicles in motion, sports action, children playing, or the like with little or no blur. At the same time, in portions of the image that do not include motion, the exposure control system 300 can select pixel data from photodiodes with a different exposure time. In some cases, the exposure control system 300 can select pixel data from photodiodes exposure groups based on AEC settings. The resulting images can have low blur for objects in motion for both well illuminated and poorly illuminated objects (or features) in motion.

In comparison, systems that do not detect motion and adjust exposure settings and/or select sub-pixels having shorter exposure times based on the detected motion may produce blurred images of objects (or features) in motion. In some cases, when AEC is employed, the presence of blur for a feature (or object) in motion can depend on how well illuminated the feature is. For example, a short exposure time may be selected for an object in motion in strong illumination (e.g., pixel saturation under if a long exposure time is used) and the object may appear in a captured image with little or no blur. In contrast, a long exposure time may be selected for the same object in motion under low illumination (e.g., in a shadow), and the object may appear in a captured image with blur.

Figure 5:
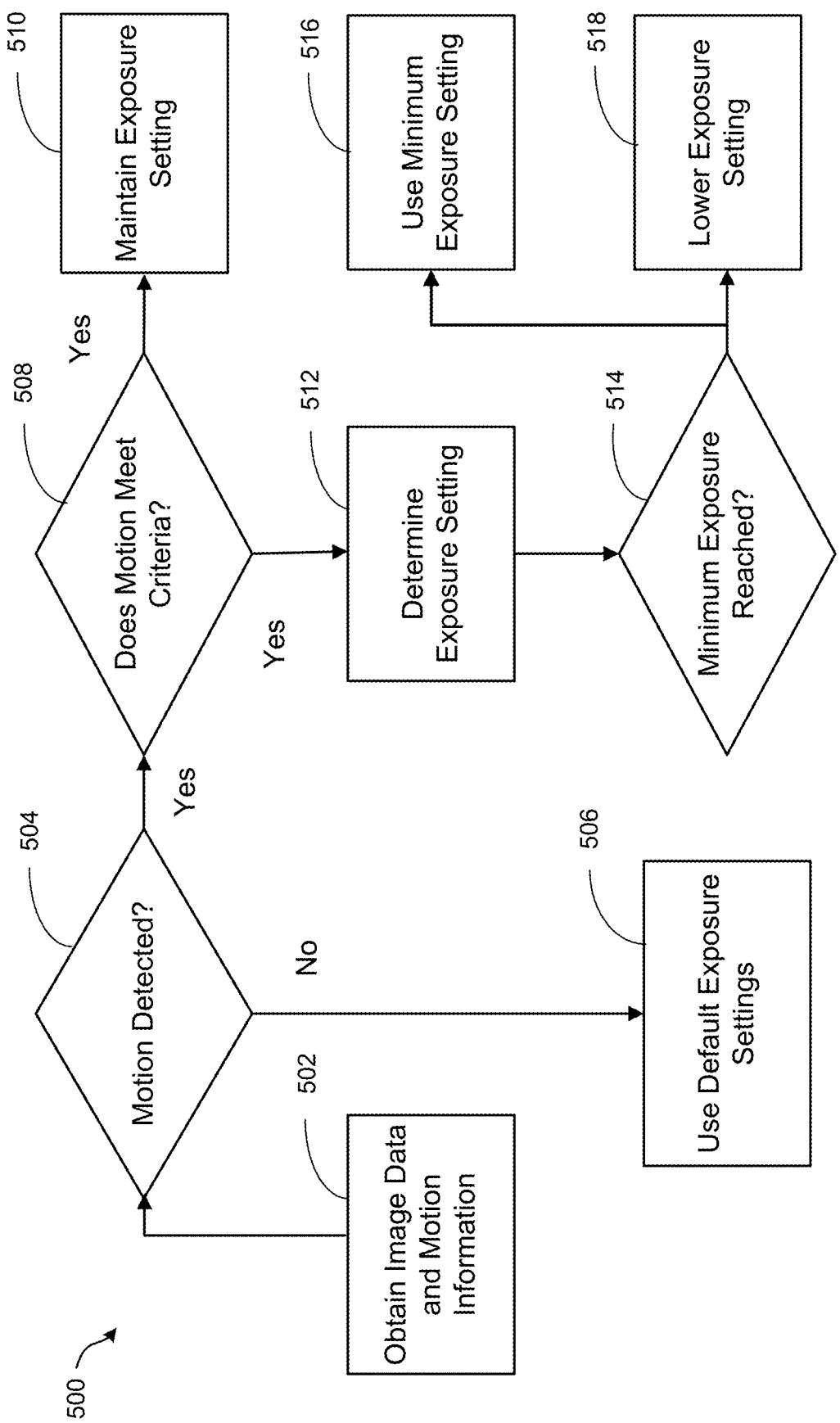
FIG. 5 is a flow diagram illustrating an example of an exposure control process, in accordance with some examples.

FIG. 5 is a flow diagram illustrating an example of an exposure control process 500. At block 502, the process 500 includes obtaining image data and motion information. For example, the image data can be obtained from the image capture device 302 of FIG. 3 and/or the motion detection engine 306 of FIG. 3.

At block 504, the process 500 can determine from the motion information whether motion was detected. If no motion is indicated by the motion information, the process 500 can proceed to block 506. At block 506, the process 500 can configure an image capture device to begin capturing using default exposure settings (e.g., AEC) and/or maintain an existing configuration of the image capture device using default exposure settings. In some cases, maintaining the existing configuration using default exposure settings can require no explicit action by the process 500.

At block 508, the process 500 can determine whether motion indicated by the motion information meets certain criteria for exposure adjustment. In one illustrative example, if a group or span of blurred pixels associated with a moving object (or feature) exceeds a threshold number of blurred pixels, then the process 500 can determine that the motion information meets the criteria for exposure adjustment. In another illustrative example, if the process 500 determines that a moving object (or feature) exceeds a threshold velocity based on an amount of time between captured images, the process 500 can determine that the motion information meets the criteria for exposure adjustment. Other criteria can also be used in addition to pixel blur and/or velocity, such as object size, and/or other criteria. For example, if the only object in motion in a captured image is small (e.g., an insect or a bird), the process 500 may determine that no exposure control adjustment is required.

If the process determines that none of the motion contained in the motion information meets the criteria for exposure adjustment, the process 500 can proceed to block 510. At block 510, the process 500 can maintain existing exposure settings. For example, the captured image may include an object in motion, but a short exposure time results in the object in motion having sufficiently low blur in the captured image. In some cases, the exposure settings can be maintained to allow subsequent images of the object in motion to also be captured without blur while avoiding unnecessarily further lowering exposure time.

If the process 500 determines that at least a portion of the motion contained in the motion information meets the criteria for exposure adjustment, the process 500 can proceed to block 512. At block 512, the process 500 can determine an amount of adjustment (e.g., how much to lower the exposure time) to reduce the blur in subsequent captured images to within an acceptable value based on the criteria for exposure adjustment. For example, if the criteria for exposure adjustment requires an object blur not to exceed one pixel, and the motion data indicated that the object blur spans two pixels, then the process 500 can determine that the exposure setting should be lowered by at least one half (e.g., fifty percent). In some cases, the process 500 can determine an exposure adjustment for each object, feature, and/or motion mask. In some implementations, the process 500 may only be capable of providing a single exposure setting for all pixels included in a sub-group of pixels used for capturing objects in motion. In such cases, the process 500 can determine an exposure setting based on all of the different determined exposure adjustments. In one illustrative example, the process 500 can select the lowest of all determined exposure settings, which can address blur for all of the objects in motion that meet the motion criteria. In another illustrative example, the exposure control system can compute a weighted average of the determined exposure settings. In some cases, the weighting can include consideration of the size of each moving object. Once the process 500 determines exposure adjustments for each object, feature and/or motion mask, the process can proceed to block 514

At block 514, the process 500 includes determining whether any of the exposure time adjustments determined by the process 500 at block 512 would result in an exposure time below a minimum exposure time value. For example, a minimum exposure time value may be set based on the amount of gain required to meet minimum sensitivity requirements of an image capture device. As noted above, a large gain can also amplify noise, resulting in poor image quality. In an example where an image capture device supports multiple exposure settings for different groups of sub-pixels used for motion detection, the process 500 can determine whether each of the determined exposure time adjustments will result in an exposure time lower than the minimum exposure time value.

For any group of sub-pixels with a determined exposure time adjustment that will result in an exposure time lower than the minimum exposure time value (also referred to herein as over-adjusted groups of sub-pixels), the process 500 can proceed to block 516. At block 516, the process 500 can set the exposure time for any over-adjusted group of sub-pixels to the minimum exposure time value.

For any group of sub-pixels with a determined exposure time adjustment that is above the minimum exposure time value, the process 500 can proceed to block 518. At block 518, the process 500 can lower the exposure time setting for each photodiode exposure group consistent with the determined exposure setting determined at block 512.

In some cases, once the process 500 reaches any of blocks 506 or 510 and/or completes the exposure setting adjustments at block 516 and/or 518 for all pixels, the process 500 can return to block 502 to perform exposure control on a subsequent image captured in a series of images by an image capture device.

Figure 6:
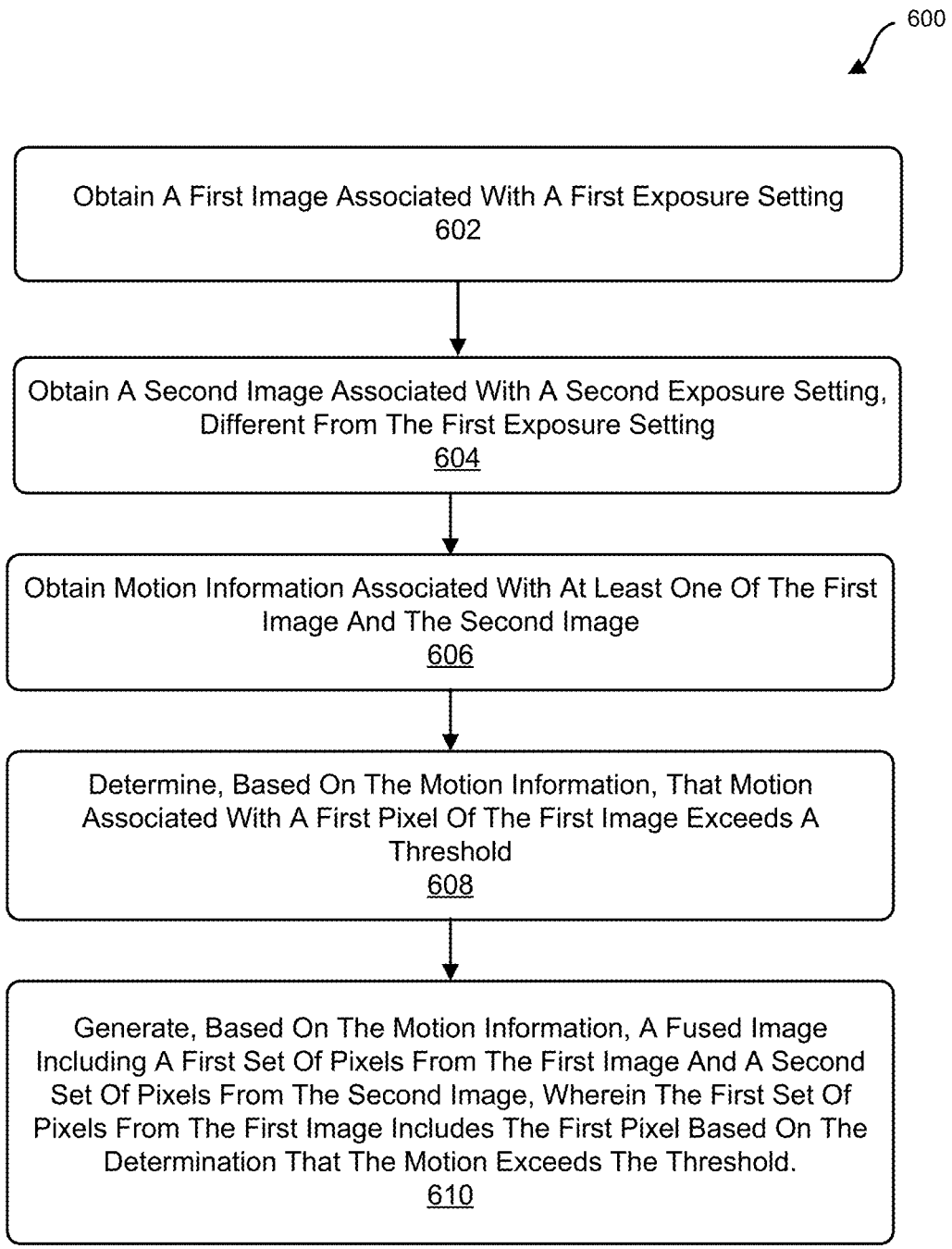
FIG. 6 is a flow diagram illustrating an example of a process for capturing images, in accordance with some examples.

FIG. 6 is a flow diagram illustrating an example of a process 600 of capturing images. At block 602, the process 600 includes obtaining a first image associated with a first exposure setting. In some cases, the first exposure setting includes at least one of a first exposure time and a first gain.

At block 604, the process 600 includes obtaining a second image associated with a second exposure setting. In some examples, the second exposure setting can be different from the first exposure setting. In some cases, the first image and the second image are captured by a same image capture device (e.g., image capture devices 302 of FIG. 3). For example, the first image may be captured by a first photodiode exposure group (see photodiode exposure group array 120 of FIG. 1C) and the second image may be captured by a second photodiode exposure group (e.g., in the same photodiode exposure group array 120 of FIG. 1C). In some cases, the second exposure setting includes at least one of a second exposure time and a second gain. In some examples, the second exposure time is longer than the first exposure time. In some examples, a product of the first exposure time and first gain of the first exposure setting is configured to be equal to a product of the second exposure time and second gain of the second exposure setting.

At block 606, the process 600 includes obtaining motion information associated with at least one of the first image and the second image. For example, the process 600 can obtain motion information from a motion detection engine (e.g., motion detection engine 306 of FIG. 3). In some cases, determining the motion associated with the first pixel of the first image exceeds the threshold includes generating a motion mask (e.g., motion masks 408, 410) associated with the first pixel.

At block 608, the process 600 includes determining, based on the motion information, that motion associated with a first pixel of the first image exceeds a threshold. In some examples, determining the motion associated with the first pixel of the first image exceeds the threshold includes generating a motion mask associated with the first pixel. In some cases, the motion mask is associated with an object and the first pixel is associated with the object. In some implementations a location of the motion mask is based on projected motion of the object. the projected motion of the object is based on a previous image captured prior to the first image and the second image.

At block 610, the process 600 includes generating, based on the motion information, a fused image. In some examples, the fused image includes a first set of pixels from the first image and a second set of pixels from the second image. In some cases, the first set of pixels from the first image includes the first pixel based on the determination that the motion associated with the first pixel exceeds the threshold.

In some cases, the process 600 includes obtaining a third image associated with a third exposure setting that is different from the first exposure setting and the second exposure setting. The fused image further includes a third set of pixels from the third image. In some cases, the first image, the second image, and the third image are obtained from a same image sensor.

In some examples, the process 600 includes adjusting an exposure setting associated with the first set of pixels based on the motion information. In some implementations, adjusting the exposure setting associated with the first set of pixels includes determining an amount of adjustment based on one or more of an amount of blur, a velocity of a feature associated with the first set of pixels, a velocity of an object associated with the first set of pixels, a size of a feature associated with the first set of pixels, and a size of an object associated with the first set of pixels. In some cases, determining that adjusting the exposure setting based on the amount of adjustment will result in the exposure setting falling below a minimum exposure setting and, based on the determination, adjusting the exposure setting to the minimum exposure setting.

In some implementations, the process 600 includes determining, based on the motion information, that motion associated with a second pixel of the second image does not exceed the threshold. The second set of pixels from the second image includes the second pixel based on the determination that the second pixel does not exceed the threshold.

In some examples, the processes described herein (e.g., process 500, 600 and/or other process described herein) may be performed by a computing device or apparatus. In one example, one or more of the processes can be performed by the exposure control system 300 of FIG. 3. In another example, one or more of the processes can be performed by the computing system 900 shown in FIG. 9. For instance, a computing device with the computing system 900 shown in FIG. 9 can include the components of the exposure control system 300 and can implement the operations of the process 500 of FIG. 5, process 600 of FIG. 6 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the processes 500, 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 600, are illustrated as a logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500, 600, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
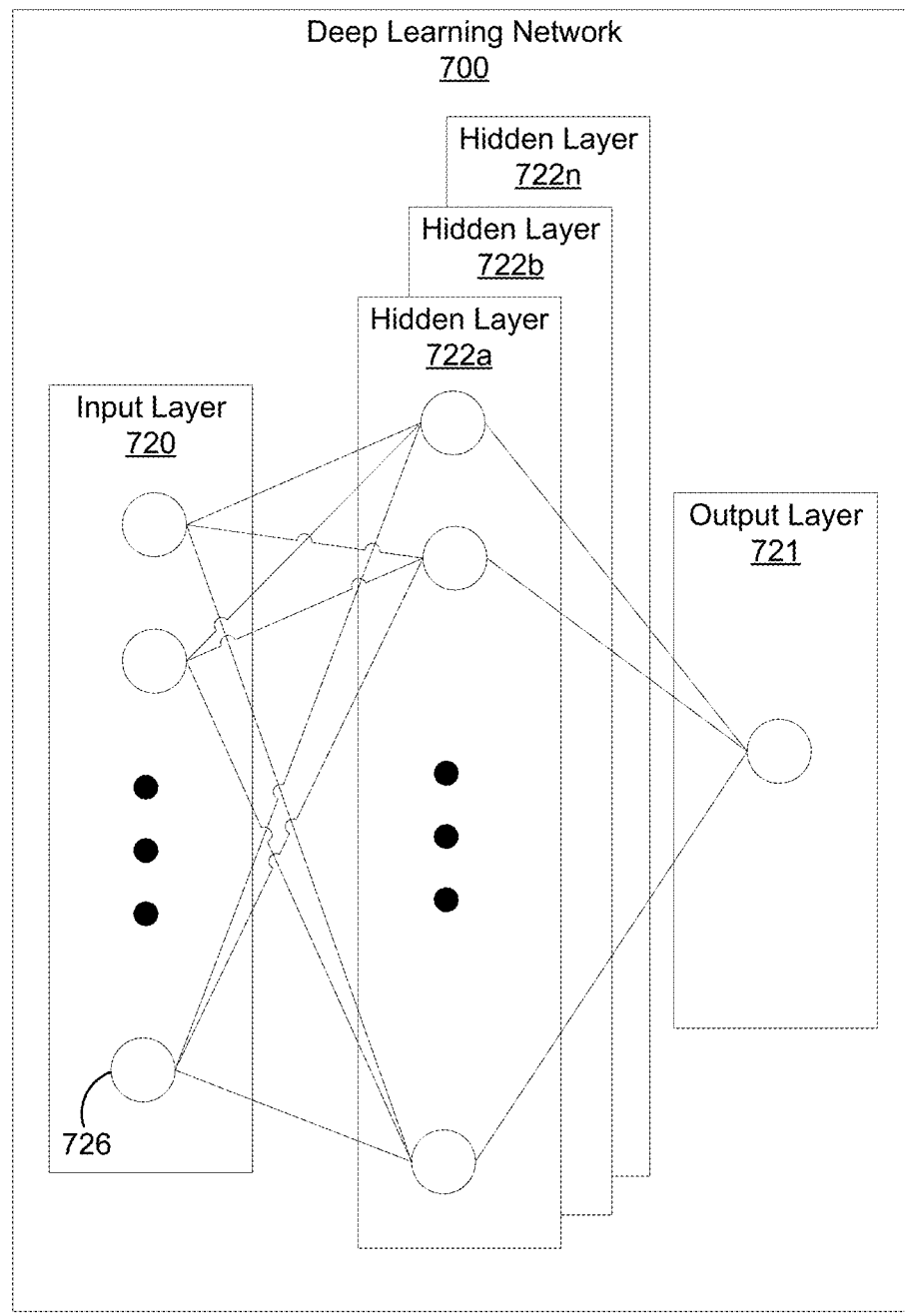
FIG. 7 is a block diagram illustrating an example of a deep learning network, in accordance with some examples.

As noted above, various aspects of the present disclosure can use machine learning models or systems. FIG. 7 is an illustrative example of a deep learning neural network 700 that can be used to implement the machine learning based feature extraction and/or activity recognition (or classification) described above. An input layer 720 includes input data. In one illustrative example, the input layer 720 can include data representing the pixels of an input video frame. The neural network 700 includes multiple hidden layers 722*a*, 722*b*, through 722*n*. The hidden layers 722*a*, 722*b*, through 722*n* include "n" number of hidden layers, where "n" is an integer greater than or equal to one. The number of hidden layers can be made to include as many layers as needed for the given application. The neural network 700 further includes an output layer 721 that provides an output resulting from the processing performed by the hidden layers 722*a*, 722*b*, through 722*n*. In one illustrative example, the output layer 721 can provide a classification for an object in an input video frame. The classification can include a class identifying the type of activity (e.g., looking up, looking down, closing eyes, yawning, etc.).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722*a*. For example, as shown, each of the input nodes of the input layer 720 is connected to each of the nodes of the first hidden layer 722*a*. The nodes of the first hidden layer 722*a* can transform the information of each input node by applying activation functions to the input node information. The information derived from the transformation can then be passed to and can activate the nodes of the next hidden layer 722*b*, which can perform their own designated functions. Example functions include convolutional, up-sampling, data transformation, and/or any other suitable functions. The output of the hidden layer 722*b* can then activate nodes of the next hidden layer, and so on. The output of the last hidden layer 722*n* can activate one or more nodes of the output layer 721, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721. In an example in which the neural network 700 is used to identify features and/or objects in images, the neural network 700 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying features and/or objects in images, the forward pass can include passing a training image through the neural network 700. The weights are initially randomized before the neural network 700 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E_{total}=\Sigma\frac{1}{2}(target-output)^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
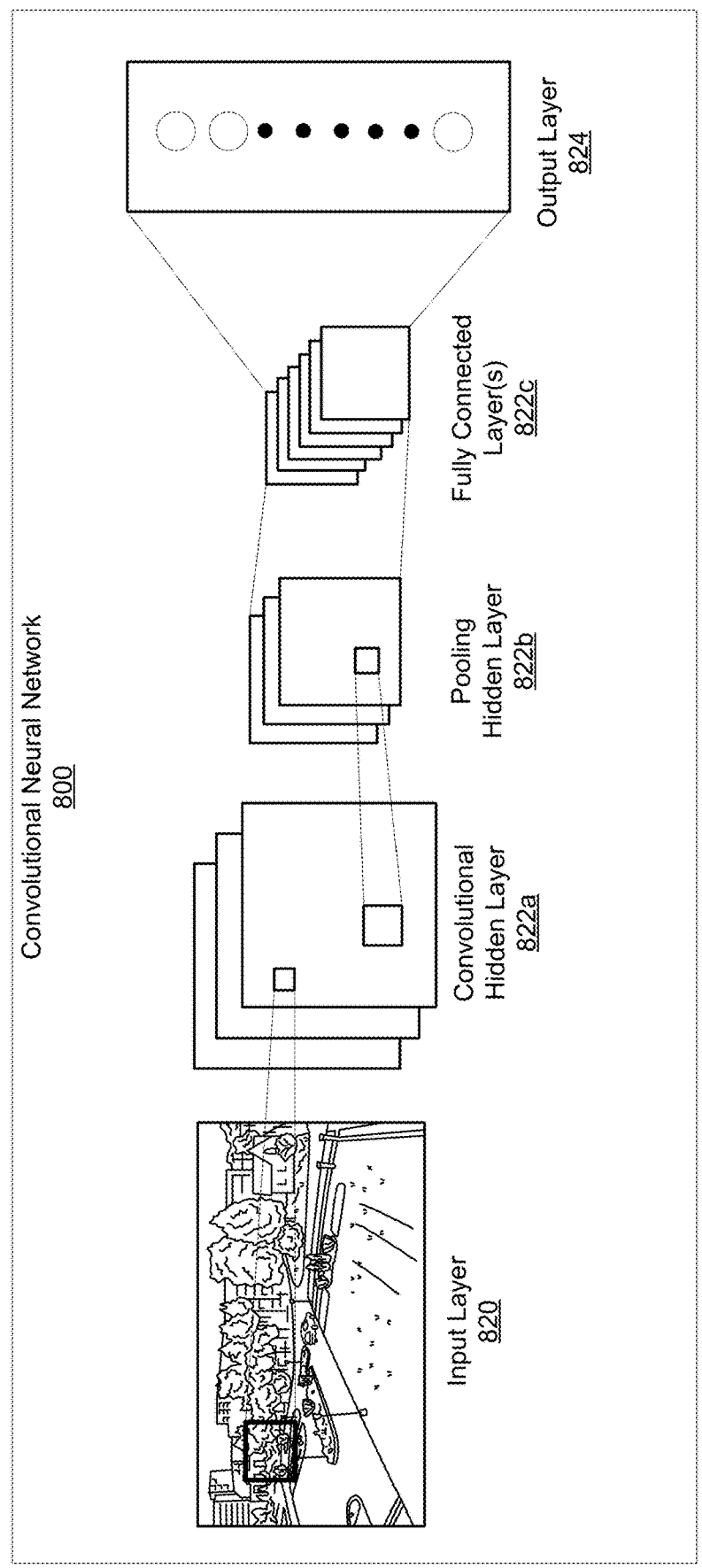
FIG. 8 is a block diagram illustrating an example of a convolutional neural network, in accordance with some examples.

FIG. 8 is an illustrative example of a convolutional neural network (CNN) 800. The input layer 820 of the CNN 800 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a stride (e.g., equal to a dimension of the filter, such as a stride of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling hidden layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822b is connected to every node of the output layer 824.

The fully connected layer 822c can obtain the output of the previous pooling hidden layer 822b (which should represent the activation maps of high-level features) and determines the features that most correlate to a particular class. For example, the fully connected layer 822c layer can determine the high-level features that most strongly correlate to a particular class, and can include weights (nodes) for the high-level features. A product can be computed between the weights of the fully connected layer 822*c* and the pooling hidden layer 822*b* to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10). M indicates the number of classes that the CNN 800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of capturing images, comprising: obtaining a first image associated with a first exposure setting; obtaining a second image associated with a second exposure setting, the second exposure setting being different from the first exposure setting; obtaining motion information associated with at least one of the first image and the second image; determining, based on the motion information, that motion associated with a first pixel of the first image exceeds a threshold; and generating, based on the motion information, a fused image including a first set of pixels from the first image and a second set of pixels from the second image, wherein the first set of pixels from the first image includes the first pixel based on the determination that the motion associated with the first pixel exceeds the threshold.

Aspect 2: The method of Aspect 1, further comprising: obtaining a third image associated with a third exposure setting that is different from the first exposure setting and the second exposure setting, wherein the fused image further includes a third set of pixels from the third image.

Aspect 3: The method of any of Aspects 1 to 2, wherein the first image, the second image, and the third image are obtained from a same image sensor.

Aspect 4: The method of any of Aspects 1 to 3, wherein the first exposure setting comprises a first exposure time and the second exposure setting comprises a second exposure time longer than the first exposure time.

Aspect 5: The method of any of Aspects 1 to 4, wherein the first exposure setting and the second exposure setting each comprise a gain and an exposure time, and wherein a product of the exposure time and the gain of the first exposure setting is configured to be equal to a product of the exposure time and the gain of the second exposure setting.

Aspect 6: The method of any of Aspects 1 to 5, wherein determining the motion associated with the first pixel of the first image exceeds the threshold includes generating a motion mask associated with the first pixel.

Aspect 7: The method of any of Aspects 1 to 6, wherein the motion mask is associated with an object and the first pixel is associated with the object.

Aspect 8: The method of any of Aspects 1 to 7, wherein a location of the motion mask is based on projected motion of the object.

Aspect 9: The method of any of Aspects 1 to 8, wherein the projected motion of the object is based on a previous image captured prior to the first image and the second image.

Aspect 10: The method of any of Aspects 1 to 9, further comprising adjusting an exposure setting associated with the first set of pixels based on the motion information.

Aspect 11: The method of any of Aspects 1 to 10, wherein adjusting the exposure setting associated with the first set of pixels comprises determining an amount of adjustment based on one or more of an amount of blur, a velocity of a feature associated with the first set of pixels, a velocity of an object associated with the first set of pixels, a size of a feature associated with the first set of pixels, and a size of an object associated with the first set of pixels.

Aspect 12: The method of any of Aspects 1 to 11, further comprising: determining that adjusting the exposure setting based on the amount of adjustment will result in the exposure setting falling below a minimum exposure setting and, based on the determination, adjusting the exposure setting to the minimum exposure setting.

Aspect 13: The method of any of Aspects 1 to 12, further comprising: determining, based on the motion information, that motion associated with a second pixel of the second image does not exceed the threshold, wherein the second set of pixels from the second image includes the second pixel based on the determination that the second pixel does not exceed the threshold.

Aspect 14: An apparatus for capturing images, comprising: at least one memory; and at least one processor coupled to the at least memory and configured to: obtain a first image associated with a first exposure setting; obtain a second image associated with a second exposure setting, the second exposure setting being different from the first exposure setting; obtain motion information associated with at least one of the first image and the second image; determine, based on the motion information, that motion associated with a first pixel of the first image exceeds a threshold; and generate, based on the motion information, a fused image including a first set of pixels from the first image and a second set of pixels from the second image, wherein the first set of pixels from the first image includes the first pixel based on the determination that the motion associated with the first pixel exceeds the threshold.

Aspect 15: The apparatus of Aspect 14, wherein the at least one processor is configured to: obtain a third image associated with a third exposure setting being different from the first exposure setting and the second exposure setting, wherein the fused image further includes a third set of pixels from the third image.

Aspect 16: The apparatus of any of Aspects 14 to 15, wherein the first image, the second image, and the third image are obtained from a same image sensor.

Aspect 17: The apparatus of any of Aspects 14 to 16, wherein the first exposure setting comprises a first exposure time and the second exposure setting comprises a second exposure time longer than the first exposure time.

Aspect 18: The apparatus of any of Aspects 14 to 17, wherein the first exposure setting and the second exposure setting each comprise a gain and an exposure time, and wherein a product of the exposure time and the gain of the first exposure setting is configured to be equal to a product of the exposure time and the gain of the second exposure setting.

Aspect 19: The apparatus of any of Aspects 14 to 18, wherein, to determine the motion associated with the first pixel of the first image exceeds the threshold, the at least one processor is configured to generate a motion mask associated with the first pixel.

Aspect 20: The apparatus of any of Aspects 14 to 19, wherein the motion mask is associated with an object and the first pixel is associated with the object.

Aspect 21: The apparatus of any of Aspects 14 to 20, wherein a location of the motion mask is based on projected motion of the object.

Aspect 22: The apparatus of any of Aspects 14 to 21, wherein the projected motion of the object is based on a previous image captured prior to the first image and the second image.

Aspect 23: The apparatus of any of Aspects 14 to 22, wherein the at least one processor is configured to: adjust an exposure setting associated with the first set of pixels based on the motion information.

Aspect 24: The apparatus of any of Aspects 14 to 23, wherein, to adjust the exposure setting associated with the first set of pixels, the at least one processor is configured to determine an amount of adjustment based on one or more of an amount of blur, a velocity of a feature associated with the first set of pixels, a velocity of an object associated with the first set of pixels, a size of a feature associated with the first set of pixels, and a size of an object associated with the first set of pixels.

Aspect 25: The apparatus of any of Aspects 14 to 24, wherein the at least one processor is configured to: determine that adjust the exposure setting based on the amount of adjustment will result in the exposure setting falling below a minimum exposure setting and, based on the determination, adjust the exposure setting to the minimum exposure setting.

Aspect 26: The apparatus of any of Aspects 14 to 25, wherein the at least one processor is configured to determine, based on the motion information, that motion associated with a second pixel of the second image does not exceed the threshold, wherein the second set of pixels from the second image includes the second pixel based on the determination that the second pixel does not exceed the threshold.

Aspect 27: The apparatus of claim 14, further comprising at least one camera configured to capture at least one image.

Aspect 28: The apparatus of claim 14, wherein the apparatus includes a mobile device or an extended reality device.

Aspect 29: A non-transitory computer readable medium comprising instructions, the instructions, when executed by a computing system, cause the computing system to perform operations according to Aspects 1 to 28.

Aspect 30: An apparatus for capturing images comprising one or more means for performing operations according to Aspects 1 to 28.

What is claimed is:

1. A method of capturing images, comprising:
   obtaining a first image associated with a first exposure setting, wherein the first image is obtained from a first group of pixels of an image sensor;
   obtaining a second image associated with a second exposure setting, the second exposure setting being different from the first exposure setting, wherein the second image is obtained from a second group of pixels of the image sensor, the second group of pixels of the image sensor being different from the first group of pixels of the image sensor;
   obtaining a third image associated with a third exposure setting, wherein the third image is obtained from a third group of pixels of the image sensor, the third group of pixels of the image sensor being different from the first group of pixels and the second group of pixels of the image sensor;
   obtaining motion information associated with at least one of the first image and the second image;
   determining, based on the motion information, that motion associated with a first pixel of the first image exceeds a motion threshold;
   determining, based on the motion information, that motion associated with a second pixel of the first image and motion associated with a third pixel of the first image do not exceed the motion threshold; and
   generating, based on the motion information, a fused image including a first set of pixels from the first image, a second set of pixels from the second image, and a third set of pixels from the third image, wherein;
      the first set of pixels from the first image includes the first pixel based on the determination that the motion associated with the first pixel exceeds the motion threshold,
      the second set of pixels includes the second pixel based on a first illumination level of the second pixel; and
      the third set of pixels includes the third pixel based on a second illumination level of the third pixel, wherein the second illumination level is different from the first illumination level.

2. The method of claim 1, further comprising: obtaining a fourth image associated with a fourth exposure setting that is different from the first exposure setting, the second exposure setting, and the third exposure setting, wherein the fused image further includes a fourth set of pixels from the fourth image.

3. The method of claim 1, further comprising determining that the motion associated with a fourth pixel does not exceed the motion threshold, wherein the first set of pixels included in the fused image includes the fourth pixel.

4. The method of claim 1, wherein: the first exposure setting comprises a first exposure time, the second exposure setting comprises a second exposure time; and the third exposure setting comprises a third exposure time, wherein the first exposure time is longer than the second exposure time and third exposure time is longer than the first exposure time.

5. The method of claim 1, wherein the first exposure setting and the second exposure setting each comprise a gain and an exposure time, and wherein a product of the exposure time and the gain of the first exposure setting is configured to be equal to a product of the exposure time and the gain of the second exposure setting.

6. The method of claim 1, wherein determining the motion associated with the first pixel of the first image exceeds the threshold includes generating a motion mask associated with the first pixel.

7. The method of claim 6, wherein the motion mask is associated with an object and the first pixel is associated with the object.

8. The method of claim 7, wherein a location of the motion mask is based on projected motion of the object.

9. The method of claim 8, wherein the projected motion of the object is based on a previous image captured prior to the first image, the second image, and the third image.

10. The method of claim 1, further comprising:
    adjusting an exposure setting associated with the first set of pixels based on the motion information.

11. The method of claim 10, wherein adjusting the exposure setting associated with the first set of pixels comprises determining an amount of adjustment based on one or more of an amount of blur, a velocity of a feature associated with the first set of pixels, a velocity of an object associated with the first set of pixels, a size of a feature associated with the first set of pixels, and a size of an object associated with the first set of pixels.

12. The method of claim 11, further comprising:
    determining that adjusting the exposure setting based on the amount of adjustment will result in the exposure setting falling below a minimum exposure setting and, based on the determination, adjusting the exposure setting to the minimum exposure setting.

13. The method of claim 1, further comprising:
    determining, based on the motion information, that motion associated with a second pixel of the second image does not exceed the threshold, wherein the second set of pixels from the second image includes the second pixel based on the determination that the second pixel does not exceed the threshold.

14. An apparatus for capturing images, comprising:
    at least one memory; and
    at least one processor coupled to the at least one memory, the at least one processor configured to:
       obtain a first image associated with a first exposure setting, wherein the first image is obtained from a first group of pixels of an image sensor;
       obtain a second image associated with a second exposure setting, the second exposure setting being different from the first exposure setting, wherein the second image is obtained from a second group of pixels of the image sensor, the second group of pixels of the image sensor being different from the first group of pixels of the image sensor;
       obtain a third image associated with a third exposure setting, wherein the third image is obtained from a third group of pixels of the image sensor, the third group of pixels of the image sensor being different from the first group of pixels and the second group of pixels of the image sensor;
       obtain motion information associated with at least one of the first image and the second image;
       determine, based on the motion information, that motion associated with a first pixel of the first image exceeds a motion threshold;
       determine, based on the motion information, that motion associated with a second pixel of the first image and motion associated with a third pixel of the first image do not exceed the motion threshold; and
       generate, based on the motion information, a fused image including a first set of pixels from the first image, a second set of pixels from the second image, and a third set of pixels from the third image, wherein:
the first set of pixels from the first image includes the first pixel based on the determination that the motion associated with the first pixel exceeds the motion threshold,
the second set of pixels includes the second pixel based on a first illumination level of the second pixel; and
the third set of pixels includes the third pixel based on a second illumination level of the third pixel, wherein the second illumination level is different from the first illumination level.

15. The apparatus of claim 14, wherein the at least one processor is configured to:
obtain a fourth image associated with a fourth exposure setting that is different from the first exposure setting, the second exposure setting, and the third exposure setting, wherein the fused image further includes a fourth set of pixels from the fourth image.

16. The apparatus of claim 4, wherein the at least one processor is configured to determine that the motion associated with a fourth pixel does not exceed the motion threshold, wherein the first set of pixels included in the fused image includes the fourth pixel.

17. The apparatus of claim 14, wherein: the first exposure setting comprises a first exposure time, the second exposure setting comprises a second exposure time, and the third exposure setting comprises a third exposure time, wherein the first exposure time is longer than the second exposure time and third exposure time is longer than the first exposure time.

18. The apparatus of claim 14, wherein the first exposure setting and the second exposure setting each comprise a gain and an exposure time, and wherein a product of the exposure time and the gain of the first exposure setting is configured to be equal to a product of the exposure time and the gain of the second exposure setting.

19. The apparatus of claim 14, wherein, to determine the motion associated with the first pixel of the first image exceeds the threshold, the at least one processor is configured to generate a motion mask associated with the first pixel.

20. The apparatus of claim 19, wherein the motion mask is associated with an object and the first pixel is associated with the object.

21. The apparatus of claim 20, wherein a location of the motion mask is based on projected motion of the object.

22. The apparatus of claim 21, wherein the projected motion of the object is based on a previous image captured prior to the first image, the second image, and the third image.

23. The apparatus of claim 14, wherein the at least one processor is configured to:
adjust an exposure setting associated with the first set of pixels based on the motion information.

24. The apparatus of claim 23, wherein, to adjust the exposure setting associated with the first set of pixels, the at least one processor is configured to:
determine an amount of adjustment based on one or more of an amount of blur, a velocity of a feature associated with the first set of pixels, a velocity of an object associated with the first set of pixels, a size of a feature associated with the first set of pixels, and a size of an object associated with the first set of pixels.

25. The apparatus of claim 24, wherein the at least one processor is configured to:
determine that adjust the exposure setting based on the amount of adjustment will result in the exposure setting falling below a minimum exposure setting and, based on the determination, adjust the exposure setting to the minimum exposure setting.

26. The apparatus of claim 14, wherein the at least one processor is configured to:
determine, based on the motion information, that motion associated with a second pixel of the second image does not exceed the threshold, wherein the second set of pixels from the second image includes the second pixel based on the determination that the second pixel does not exceed the threshold.

27. The apparatus of claim 14, further comprising at least one camera configured to capture at least one image.

28. The apparatus of claim 14, wherein the apparatus includes a mobile device or an extended reality device.

29. A non-transitory computer readable medium comprising instructions which, when executed by one or more processors, cause the one or more processors to:
obtain a first image associated with a first exposure setting, wherein the first image is obtained from a first group of pixels of an image sensor;
obtain a second image associated with a second exposure setting, the second exposure setting being different from the first exposure setting, wherein the second image is obtained from a second group of pixels of the image sensor, the second group of pixels of the image sensor being different from the first group of pixels of the image sensor;
obtain a third image associated with a third exposure setting, wherein the third image is obtained from a third group of pixels of the image sensor, the third group of pixels of the image sensor being different from the first group of pixels and the second group of pixels of the image sensor;
obtain motion information associated with at least one of the first image and the second image;
determine, based on the motion information, that motion associated with a first pixel of the first image exceeds a motion threshold;
determine, based on the motion information, that motion associated with a second pixel of the first image and motion associated with a third pixel of the first image do not exceed the motion threshold; and
generate, based on the motion information, a fused image including a first set of pixels from the first image, a second set of pixels from the second image, and a third set of pixels from the third image, wherein:
the first set of pixels from the first image includes the first pixel based on the determination that the motion associated with the first pixel exceeds the motion threshold;
the second set of pixels includes the second pixel based on a first illumination level of the second pixel; and
the third set of pixels includes the third pixel based on a second illumination level of the third pixel, wherein the second illumination level is different from the first illumination level.

30. The computer readable medium of claim 29, wherein the instructions, when executed by the one or more processors, cause the one or more processors to:

obtain a fourth image associated with a fourth exposure setting that is different from the first exposure setting, the second exposure setting, and the third exposure setting, wherein the fused image further includes a fourth set of pixels from the fourth image.

\* \* \* \* \*